United States Patent
Gantenbein et al.

(10) Patent No.: US 10,723,886 B2
(45) Date of Patent: Jul. 28, 2020

(54) SELF-BINDING PIGMENT HYBRID

(75) Inventors: Daniel Gantenbein, Elnesvagen (NO); Joachim Schoelkopf, Killwangen (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 212 days.

(21) Appl. No.: 14/238,233

(22) PCT Filed: Aug. 28, 2012

(86) PCT No.: PCT/EP2012/066658
§ 371 (c)(1),
(2), (4) Date: Apr. 17, 2014

(87) PCT Pub. No.: WO2013/030178
PCT Pub. Date: Mar. 7, 2013

(65) Prior Publication Data
US 2015/0105260 A1   Apr. 16, 2015

Related U.S. Application Data

(60) Provisional application No. 61/531,667, filed on Sep. 7, 2011.

(30) Foreign Application Priority Data

Aug. 28, 2012  (EP) ...................................... 11179572

(51) Int. Cl.
| | | |
|---|---|---|
| C09C 3/10 | (2006.01) |
| C09C 1/02 | (2006.01) |
| D21H 19/42 | (2006.01) |
| D21H 17/00 | (2006.01) |
| D21H 17/69 | (2006.01) |
| A01N 59/06 | (2006.01) |
| D21H 17/25 | (2006.01) |

(52) U.S. Cl.
CPC ................. C09C 3/10 (2013.01); A01N 59/06 (2013.01); C09C 1/021 (2013.01); D21H 17/00 (2013.01); D21H 17/25 (2013.01); D21H 17/69 (2013.01); D21H 17/74 (2013.01); D21H 19/42 (2013.01); *C01P 2004/50* (2013.01); *C01P 2004/62* (2013.01); *C01P 2006/22* (2013.01); *C01P 2006/60* (2013.01)

(58) Field of Classification Search
CPC ........... C09C 3/10; C09C 1/021; A01N 59/06; C01P 2004/50; C01P 2004/62; C01P 2006/22; C01P 2006/60; D21H 17/00; D21H 17/25; D21H 17/69; D21H 17/74; D21H 19/42
See application file for complete search history.

(56) References Cited

U.S. PATENT DOCUMENTS

| | | | |
|---|---|---|---|
| 3,728,331 | A | 4/1973 | Savage |
| 5,061,346 | A | 10/1991 | Taggart et al. |
| 5,241,009 | A | 8/1993 | Yarbrough et al. |
| 5,354,424 | A | 10/1994 | Rha et al. |
| 5,492,560 | A | 2/1996 | Fairchild |
| 5,708,162 | A | 1/1998 | Hilbig et al. |
| 6,057,398 | A | 5/2000 | Blum |
| 2007/0240619 | A1 | 10/2007 | Munchow |
| 2007/0266898 | A1 | 11/2007 | Gane et al. |
| 2008/0072785 | A1 | 3/2008 | Suau et al. |
| 2008/0210394 | A1 | 9/2008 | Mahr et al. |
| 2010/0120948 | A1 | 5/2010 | Gene et al. |
| 2010/0181395 | A1 | 7/2010 | Guerret et al. |
| 2012/0016061 | A1 | 1/2012 | Gene et al. |
| 2014/0165877 | A1 | 6/2014 | Gane et al. |

FOREIGN PATENT DOCUMENTS

| | | |
|---|---|---|
| CN | 1051826 C | 4/2000 |
| CN | 1984718 A | 6/2007 |
| DE | 1543116 | 7/1969 |
| DE | 4411681 A1 | 10/1995 |
| EP | 0056360 | 7/1982 |

(Continued)

OTHER PUBLICATIONS

Claudia Barba, Daniel Montané, Xavier Farriol, Jacques Desbrières and Marguerite Rinaudo, "Synthesis and characterization of carboxymethylcelluloses from non-wood pulps II. Rheological behavior of CMC in aqueous solution", Cellulose 9: 327-335, 2002.*
The International Search Report dated Oct. 5, 2012 for PCT Application No. PCT/EP2012/066658.
The Notice of Opposition dated Sep. 29, 2014 for EP 11179572.0.
The Response to Communication of Notices of Opposition dated Mar. 9, 2015 for EP 11179572.0.
Mark-Houwink Equation—Text and Image Sources, Contributors and Licenses.
Talwar "A study of improved strength in paper made from low-substituted carboxymethylcellulose pulps." The Institute of Paper Chemistry, Jun. 1957, pp. 1-98.
Roempp-Lexikon Chemie Publisher: Jurgen Falbe; Manfred Regitz. Edited by Eckard Amelingmeier; Stuttgart; New York; Thieme; 10th Edition; vol. 3. H-L, keyword "Huggings-Gleichung", pp. 1813-1814. Cited in Opposition. 1997.

(Continued)

*Primary Examiner* — Mina Haghighatian
*Assistant Examiner* — Nathan W Schlientz
(74) *Attorney, Agent, or Firm* — Heslin Rothenberg Farley & Mesiti P.C.

(57) ABSTRACT

The present invention relates to a process for preparing self-binding pigment particles comprising the following steps: a) providing an aqueous mineral pigment material suspension; b) providing at least one polymeric binder, wherein the binder comprises at least one modified polysaccharide having a degree of carboxylation in the range of 0.4 to 2.0 and having an intrinsic viscosity in the range of >300 to 500 ml/g, c) mixing the binder of step b) with the aqueous mineral pigment material suspension of step a) and adjusting the solids content of the obtained suspension so that it is >45 to 95 wt.-%, preferably from 45 to 80 wt.-%, based on the total weight of the suspension, and d) grinding the aqueous mineral material suspension of step c).

40 Claims, No Drawings

(56) References Cited

FOREIGN PATENT DOCUMENTS

| | | |
|---|---|---|
| EP | 2505614 A1 | 10/2012 |
| EP | 2505614 B1 | 11/2013 |
| GB | 1139637 | 1/1969 |
| JP | 11340022 A | 12/1999 |
| JP | 2001064407 A | 3/2001 |
| JP | 2004043548 | 2/2004 |
| JP | 4285800 B2 | 6/2009 |
| RU | 94041190 A | 9/1996 |
| RU | 2531183 C2 | 10/2014 |
| WO | 9108341 A1 | 6/1991 |
| WO | 9843595 A1 | 10/1998 |
| WO | 2005111153 A1 | 11/2005 |
| WO | 2006008657 A2 | 1/2006 |
| WO | 2006128814 A1 | 12/2006 |
| WO | 2008139292 A1 | 11/2008 |
| WO | 2010082107 A1 | 7/2010 |
| WO | 2010107512 A1 | 9/2010 |
| WO | WO 2010107512 A1 * | 9/2010 |

OTHER PUBLICATIONS

Roempp-Lexikon Chemie Publisher: Jurgen Falbe; Manfred Regitz. Edited by Eckard Amelingmeier; Stuttgart; New York; Thieme; 10th Edition, vol. 1. A-CI, keyword "Carboxymethylcellulose", pp. 611-612. Cited in Opposition. 1996.

J. H. Bos, P. Veenstra, H. Verhoeven, P. D. de Vos Das Papierbuch-Handbuch der Papierherstellung ECA Pulp & Paper b. v., 1. Auflage, pp. 362-388. Cited in Opposition. 1999.

Autorenkollektiv Lehrbuch der Papier—und Kartonerzeugung VEB Fachbuchverlag Leipzig, 2. Auflage, pp. 11-49. Cited in Opposition. 1987.

Autorenkollektiv Lehrbuch der Papier—und Kartonerzeugung, Veb Fachbuchverlag Leipzig, 2. Auflage, 317-321. Cited in Opposition. 1987.

Sarah Kohler, Dissertation "Ionische Fliissigkeiten als neue Reaktionsmedien filr die Veretherung von Cellulose". cited in Opposition. May 26, 2010.

Fabian Meyer, Dissertation "Konrelation rheo-mechanischer und rheooptischer Materialfunktionen wassriger Natrium-hlyaluronat—und Natrium-Carboxymethylcellulose-Losungen". Cited in Opposition. Jul. 11, 2008.

Sigma-Aldrich, product number 419273, material safety data sheet. Cited in Opposition. Sep. 23, 2014.

The Book and Paper Group Annual. Volume One 1982: Cathleen Baker "Methylcellulose & Sodium carboxymethylcellulose: Uses in Paper Conservation", 4 pages. Cited in Opposition.

CP Kelco U.S, Inc. "CMC (Book)" 2009. Cited in Opposition.

Acros Organics, product No. 33263, datasheet. Cited in Opposition. Date Unknown.

Sigma-Aldrich, product number 419281, datasheet. Cited in Opposition. Date Unknown.

Sigma-Aldrich, product number 419311, datasheet. Cited in Opposition. Date Unknown.

\* cited by examiner

SELF-BINDING PIGMENT HYBRID

CROSS-REFERENCE TO RELATED APPLICATIONS

This application is a U.S. national phase of PCT Application No. PCT/EP2012/066658, filed Aug. 28, 2012, which claims priority to European Application No. 11179572.0, filed Aug. 31, 2011 and U.S. Provisional Application No. 61/531,667, filed Sep. 7, 2011.

Binders and mineral materials are among the main constituents of paints and of paper coating colours. The former, generally latex-based and in the form of aqueous suspensions or dispersions, provide the necessary adhesion to a support and cohesion between the elements forming goods to be produced, such as paint or paper but also such as agricultural fertilizer. The latter, commonly calcium carbonate, may provide improvements, for example, in paper and painting quality and agriculture properties, notably relative to its optical properties. The concept of self-binding pigment particles is known to industry: it refers to distinct, solid particles, formed of mineral material and binder that are intimately bound to one another. The internal cohesion forces are such as to provide the self-binding pigment particles with excellent mechanical stability. Such particles may be directly implemented in a variety of applications.

Implementing self-binding pigment particles avoids the logistic difficulties of handling mineral materials and binders separately, and further avoids the unwanted physical and chemical interactions developed in comparable mixtures of minerals and binders.

Self-binding pigment particles are prepared by a process implementing at least one step of grinding mineral materials in the presence of binder, where grinding refers to an operation leading to a reduction in the particle size; the mineral materials in the self-binding pigment particles have a smaller diameter than the initial mineral material used to produce them. Such self-binding pigment particles are described in a number of documents, including WO 2006/008657, WO 2006/128814, and WO 2008/139292.

However, the processes for preparing self-binding mineral pigment particles known in the art are limited to the preparation or the co-grinding of suspensions having a low solids content. High solid content suspensions could only be processed if corresponding dispersants would be added as mentioned, for example, in EP 1 747 252, which relates to a method for producing surface-modified inorganic fillers or pigments of a desired particle size.

Said method is characterised in that filler or pigment slurries of inorganic fillers or pigments are milled to the desired particle size under the action of compressive and shear forces using polymer dispersions in combination with milling aids and/or dispersing agents. The addition of dispersant, however, inter alia affects the adsorption of the binder to the particles during the co-grinding.

On the other hand, the preparation of low solids content suspensions has the disadvantage that the obtained ground product has to be concentrated before being shipped to other facilities for further processing. During the time and energy consuming concentrating step, very often an undesired loss of polymeric binder is observed, and, additionally, unwanted agglomerates are formed. Furthermore, the prior art processes often lead to a suspension having a high total organic content of the aqueous phase of the ground suspension.

In view of the foregoing, improving the self-binding pigment particle production process remains of interest to the skilled man. It would be especially desirable to provide a process for making self-binding mineral pigment particles which can be applied to mineral pigment suspensions having a high solids content, thus, avoiding an energy and time consuming up-concentrating step and, e.g., the formation of significant amounts of unwanted agglomerates.

A further object of the present invention is to reduce or eliminate fossil based binder raw material to follow at most the Kyoto protocol to reduce fossil $CO_2$ pollution of the atmosphere during combustion of the final goods.

The Kyoto Protocol is an international agreement linked to the United Nations Framework Convention on Climate Change. The major feature of the Kyoto Protocol is that it sets binding targets for 37 industrialized countries and the European community for reducing greenhouse gas (GHG) emissions. This amounts to an average of five percent against 1990 levels over the five-year period 2008 to 2012. The Kyoto Protocol was adopted in Kyoto, Japan, on 11 Dec. 1997 and entered into force on 16 Feb. 2005.

While the Applicant knows as a solution the unpublished European Patent Application Number 11 160900.4 describing a process for the preparing self-binding pigment particles comprising the steps of: a) providing an aqueous mineral pigment suspension, b) providing at least one polymeric binder, wherein the binder comprises at least one carboxymethylcellulose having a degree of carboxylation in the range of 0.4 to 2.0 and having an intrinsic viscosity in the range of 3 to 300 ml/g, c) mixing the binder of step b) with the aqueous mineral pigment material suspension of step a) and adjusting the solids content of the obtained suspension so that it is from 45 to 80 wt.-%, based on the total weight of the suspension, and d) grinding the aqueous mineral material suspension of step c), and the unpublished European Patent Application Number 11 160926.9 describing a process for the preparing self-binding pigment particles comprising the steps of: a) providing an aqueous mineral pigment suspension, b) providing at least one polymeric binder, wherein the binder comprises at least one modified polysaccharide having a degree of carboxylation in the range of 0.4 to 2.0 and having an intrinsic viscosity in the range of 3 to 300 ml/g, wherein the carbon of the binder shows a rate of nuclear transformation of $^{14}C$ to $^{12}C$ of between 900 and 920 transformations per hour and per gram carbon in the binder; c) mixing the binder of step b) with the aqueous mineral pigment material suspension of step a) and adjusting the solids content of the obtained suspension so that it is from 45 to 80 wt.-%, based on the total weight of the suspension, and d) grinding the aqueous mineral material suspension of step c) until the fraction of self-binding pigment particles having a particle size of less than 1 µm is greater than 5 wt.-%, based on the total weight of the pigment particles, the foregoing and other objects are solved by the subject-matter as defined herein in the independent claims.

According to one aspect of the present invention, a process for preparing self-binding pigment particles is provided, the process comprising the following steps:

a) providing an aqueous mineral pigment material suspension;

b) providing at least one polymeric binder, wherein the binder comprises at least one modified polysaccharide having a degree of carboxylation in the range of 0.4 to 2.0 and having an intrinsic viscosity in the range of >300 to 500 ml/g, c) mixing the binder of step b) with the aqueous mineral pigment material suspension of step a) and adjusting the solids content of the obtained suspension so that it is >45 to 95 wt.-%, preferably from 45 to 80 wt.-%, based on the total weight of the suspension;

d) grinding the aqueous mineral material suspension of step c).

The inventors of the present invention found that it is possible to prepare self-binding pigment particles directly in a high solids content suspension of the mineral pigment. This is achieved by providing in a first step an aqueous mineral pigment material suspension. Furthermore, a specific binder is provided. The binder is mixed with the aqueous mineral pigment material suspension. After adjusting the suspension to a high solids content of from 45 to 80 wt.-%, based on the total weight of the suspension, the suspension is ground in order to obtain self-binding pigment particles of desired particle size.

According to a second aspect, the present invention refers to a self-binding pigment particle suspension which is obtainable by the process according to the present invention.

Another aspect of the present invention refers to the use of the inventive self-binding pigment particle suspension in paper, plastics, paint, concrete and/or agriculture applications.

Advantageous embodiments of the inventive method are defined in the corresponding sub-claims.

According to one embodiment, in step c) the binder is added to the aqueous mineral pigment suspension in an amount from 0.1 to 10.0 wt.-%, preferably 0.2 to 5 wt.-%, more preferably 0.25 to 3.0 wt.-%, based on the total weight of the suspension. According to another embodiment, the binder is in form of a solution or a dry material, preferably in form of an aqueous solution having a binder concentration from 0.5 to 50 wt.-%, preferably from 1 to 40 wt.-%, more preferably from 3 to 20 wt.-%, and most preferably from 4 to 10 wt.-%, based on the total weight of the solution.

According to one embodiment the binder only consists of at least one modified polysaccharide. According to another embodiment the at least one modified polysaccharide is carboxymethylcellulose. According to still another embodiment the binder is composed of a mixture of two or more types of modified polysaccharide, wherein at least one has a degree of carboxylation in the range of 0.4 to 2.0 and an intrinsic viscosity in the range of >300 to 500 ml/g.

According to one embodiment the solids content of the suspension obtained in step c) is adjusted so that it is from 45 to 80 wt.-%, preferably from 45 to 60 wt.-%, more preferably from 48 to 58 wt.-%, and most preferably to 50 to 55 wt.-%, based on the total weight of the suspension.

According to one embodiment the carboxylic groups of the at least one modified polysaccharide are at least partly neutralized by adding to the aqueous mineral pigment material suspension prior or during the grinding step d) one or more polyvalent cations, wherein the polyvalent cations preferably are selected from $Sr^{2+}$, $Ca^{2+}$, or $Mg^{2+}$, and most preferably from $Ca^{2+}$ added in form of $Ca(OH)_2$ in suspension and/or solution. According to another embodiment the carboxylic groups of the at least one modified polysaccharide are at least partly neutralized by adding to the aqueous mineral pigment material suspension prior or during the grinding step d) one or more polyvalent cations, in situ formed, by adding an acid, preferably $H_3PO_4$, or acidic reacting salt, preferably $CaHPO_4$. According to still another embodiment the carboxylic groups of the at least one modified polysaccharide are at least partly neutralized by adding to the aqueous mineral pigment material suspension prior or during the grinding step d) one or more monovalent cations, wherein the monovalent cations preferably are selected from $Li^+$, $Na^+$, or $K^+$.

According to one embodiment the carboxylic groups of the at least one modified polysaccharide are at least partly neutralized by adding to the aqueous mineral pigment material suspension prior or during the grinding step d) a combination of one or more polyvalent cations and one or more monovalent cations, wherein the polyvalent cations preferably are selected from $Sr^{2+}$, $Ca^{2+}$, or $Mg^{2+}$, and most preferably from $Ca^{2+}$ added in form of $Ca(OH)_2$ in suspension and/or solution, and wherein the monovalent cations preferably are selected from $Li^+$, $Na^+$, or $K^+$.

According to one embodiment the grinding step d) is carried out until the fraction of self-binding pigment particles having a particle size of less than 1 µm is greater than 5 wt.-%, preferably greater than 20 wt.-%, more preferably greater than 60 wt.-%, more preferably greater than 75 wt.-%, and most preferably greater than 85 wt.-%, based on the total weight of the pigment particles. According to another embodiment before or during or after steps c) and/or d) a dispersing agent is added.

According to one embodiment said mineral pigment material is selected from calcium carbonate, calcium carbonate containing minerals, mixed carbonate based fillers, or mixtures thereof, and wherein the calcium carbonate containing minerals preferably comprise dolomite, and the mixed carbonate based fillers are preferably selected from calcium associated with magnesium, clay, talc, talc-calcium carbonate mixtures, calcium carbonate-kaolin mixtures, or mixtures of natural calcium carbonate with aluminium hydroxide, mica or with synthetic or natural fibers or co-structures of minerals, preferably talc-calcium carbonate or calcium carbonate-titanium dioxide or talc-titanium dioxide co-structures. According to one embodiment the calcium carbonate is a ground natural calcium carbonate, a precipitated calcium carbonate, a modified calcium carbonate, or a mixture thereof.

According to one embodiment the degree of carboxylation of the at least one modified polysaccharide is in the range of 0.4 to 2.0, 0.5 to 1.8, 0.6 to 1.0, or 0.7 to 0.9. According to another embodiment the at least one modified polysaccharide has a degree of carboxylation of smaller than 1, and an intrinsic viscosity in the range of >300 to 500 ml/g, preferably 320 to 450 ml/g, and more preferably 330 to 350 ml/g.

According to still another embodiment the at least one modified polysaccharide has a degree of carboxylation of 1 or less, and an intrinsic viscosity in the range of >300 to 500 ml/g, preferably 320 to 450 ml/g, and more preferably 330 to 350 ml/g.

According to one embodiment the grinding step d) is carried out at a temperature from 25 to 110° C., preferably from 35 to 70° C. According to another embodiment the grinding step d) is carried out in batch or continuously, preferably continuously.

According to one embodiment the self-binding pigment particle suspension is used in the wet end process of a paper machine, in cigarette paper and/or coating applications, as support for rotogravure and/or offset and/or digital printing.

According to another embodiment, the self-binding pigment particle suspension is used to reduce sun light and UV exposure of plant leaves.

Throughout the present document, the "degree of carboxylation" is specified in respect to the total amount of hydroxyl groups per unmodified monomer unit of the original polysaccharide.

The term "intrinsic viscosity" as used in the context of the present invention is a measure of the capability of a polymer in solution to enhance the viscosity of the solution and is specified in mug.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.4 and 2 μm, a Sedigraph 5120 device from the company Micromeritics, USA, can be used.

A "suspension" or "slurry" in the meaning of the present invention comprises insoluble solids and water, and optionally further additives, and usually contains large amounts of solids and, thus, is more viscous and can be of higher density than the liquid from which it is formed.

The inventive process for preparing self-binding pigment particles provides several important advantages. Firstly, the inventive process provides a very good adsorption of the binder to the particle surface. Additionally, the formation of unwanted aggregates is reduced by applying the inventive process since a subsequent concentrating step can be avoided due to the processing of a high solids content suspension.

Also the grinding efficiency is improved by following the inventive process.

In the following the details and preferred embodiments of the inventive process will be set out in more detail. It is to be understood that these technical details and embodiments also apply to the inventive self-binding pigment particle suspensions and their use.

Step a)

In step a) of the process according to the present invention an aqueous mineral pigment material suspension is provided. The aqueous mineral pigment material suspension is obtained by mixing a mineral pigment material with water.

The mineral pigment material to be processed according to the inventive process may be selected from calcium carbonate, calcium carbonate containing minerals, mixed carbonate based fillers, or mixtures thereof.

According to a preferred embodiment of the present invention, the mineral pigment material is a calcium carbonate. Calcium carbonate may be a ground natural calcium carbonate, also named heavy calcium carbonate, a precipitated calcium carbonate, also named light calcium carbonate, a modified calcium carbonate, or a mixture thereof.

"Ground natural calcium carbonate" (GNCC) in the meaning of the present invention is a calcium carbonate obtained from natural sources, such as limestone, marble, calcite or chalk, and processed through a wet and/or dry treatment such as grinding, screening and/or fractionation, for example by a cyclone or classifier.

"Modified calcium carbonate" (MCC) in the meaning of the present invention may feature a natural ground or precipitated calcium carbonate with an internal structure modification or a surface-reaction product.

According to a preferred embodiment of the present invention, the modified calcium carbonate is a surface-reacted calcium carbonate.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form.

According to one embodiment of the present invention, the calcium carbonate-containing mineral comprises dolomite.

According to a preferred embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

According to a preferred embodiment of the present invention, the aqueous mineral pigment material suspension has a solids content from 50 to 90 wt.-%, preferably from 55 to 80 wt.-%, more preferably from 60 to 75 wt.-%, and most preferably from 65 to 70 wt.-%, based on the total weight of the suspension.

Step b)

In step b) of the process according to the present invention at least one polymeric binder is provided, wherein the binder comprises at least one modified polysaccharide having a degree of carboxylation in the range of 0.4 to 2.0 and having an intrinsic viscosity in the range of >300 to 500 ml/g.

According to another embodiment of the present invention, the binder is composed of a mixture of two or more types of modified polysaccharide, wherein at least one has a degree of carboxylation in the range of 0.4 to 2.0 and an intrinsic viscosity in the range of >300 to 500 ml/g.

According to one embodiment of the present invention, the modified polysaccharide has a degree of carboxylation in the range of 0.4 to 2.0, preferably of 0.5 to 1.8, more preferably of 0.6 to 1.0, and most preferably of 0.7 to 0.9.

According to another embodiment of the present invention, the intrinsic viscosity of the at least one modified polysaccharide is in the range of >300 to 500 ml/g, preferably 320 to 450 ml/g, and more preferably of 330 to 350 ml/g.

According to a preferred embodiment of the present invention, the at least one modified polysaccharide has a degree of carboxylation of smaller than 1, and an intrinsic viscosity in the range of >300 to 500 ml/g, preferably 320 to 450 ml/g, and more preferably 330 to 350 ml/g.

Polysaccharides are polymeric carbohydrate structures, formed of repeating units (at least 10) joined together by glycosidic bonds. These structures may be linear, but may also contain various degrees of branching. Polysaccharides may also contain slight modifications of the repeating unit.

Exemplary polysaccharides are starch, cellulose, or glycogen, but also structural polysaccharides such as cellulose and chitin.

"Modified polysaccharides" in the meaning of the present invention are polysaccharides, wherein at least a part of the hydroxyl groups is carboxylated. Additionally, the modified polysaccharides may contain other modifications such as aldehyde groups.

Modified polysaccharides according to the present invention may comprise the following structure:

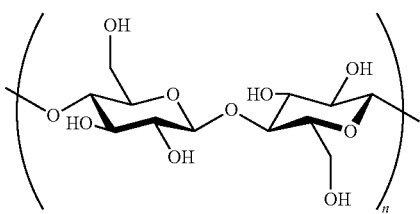

wherein a part of the hydroxyl groups is carboxylated and "n" is indirectly represented by the intrinsic viscosity.

According to a preferred embodiment of the present invention, the at least one modified polysaccharide is carboxymethylcellulose (CMC).

Carboxymethylcellulose (CMC) may be prepared from cellulose by reaction with monochloroacetic acid in the presence of caustic soda to form the sodium salt of carboxymethylcellulose. Each repeating D-glycose unit contains three hydroxyl groups capable of etherification, to give a maximum charge density of three carboxylic groups per monomer unit (i.e., a degree of substitution of three).

According to one embodiment of the present invention, the modified polysaccharide employed in the process according to the present invention has a pH from 4.5 to 12, preferably from 7 to 11, and more preferably from 8.0 to 10.5.

The modified polysaccharide can be provided as solution or dry material. According to a preferred embodiment, the modified polysaccharide is in form of an aqueous solution.

According to one embodiment of the present invention, the binder is in form of an aqueous solution having a binder concentration from 0.5 to 50 wt.-%, preferably from 1 to 40 wt.-%, more preferably from 3 to 20 wt.-%, and most preferably from 4 to 10 wt.-%, based on the total weight of the solution. The modified polysaccharide solution can be concentrated, for example, by ultrafiltration or thermal or drying. Dry modified polysaccharide is preferably produced by thermal drying, more preferably by spray drying and has a solids content of more than 90 wt.-%, and preferably from 95 to 99.9 wt.-%, based on the total weight of the modified polysaccharide.

According to a preferred embodiment of the present invention, the binder only consists of at least one modified polysaccharide, preferably carboxymethylcellulose.

Step c)

In step c) of the process according to the present invention, the binder of step b) is mixed with the aqueous mineral pigment material suspension of step a). The solids content of the obtained suspension, if below 45 wt.-%, is adjusted so that it is >45 to 95 wt.-%, preferably from 45 to 80 wt.-%, based on the total weight of the suspension.

The solids content of the suspension can be adjusted by the methods known to the skilled person. To adjust the solids content of an aqueous mineral material comprising suspension, the suspension may be partially or fully dewatered by a filtration, centrifugation or evaporation process. Alternatively, water may be added to the solid mineral material (e.g. resulting from filtration) until the desired solids content is obtained.

According to a preferred embodiment of the present invention, the solids content of the suspension to be ground during step d) is adjusted so that it is from 45 to 80 wt.-%, preferably from 45 to 60 wt.-%, more preferably from 48 to 58 wt.-%, and most preferably from 50 to 55 wt.-%, based on the total weight of the suspension.

According to one embodiment of the present invention, in step c) the binder is added to the aqueous mineral pigment suspension in an amount from 0.1 to 10.0 wt.-%, preferably in an amount from 0.2 to 5 wt.-%, more preferably in an amount from 0.25 to 3.0 wt. %, based on the total weight of the suspension.

According to one embodiment of the present invention, the carboxylic groups of the at least one modified polysaccharide are at least partly neutralized by adding to the aqueous mineral pigment material suspension prior or during the grinding step d) one or more monovalent cations. Preferably, the monovalent cations are selected from $Li^+$, $Na^+$ and $K^+$. The monovalent cations may be added in the form of an aqueous solution, suspension or powder, and preferably in the form of a solution.

It was found by the inventors that the addition of polyvalent cations to the suspension provides further advantages and especially provides improved adsorption properties of the binder comprising modified polysaccharide to the surface of the mineral. The polyvalent cations can be added during the preparation of the modified polysaccharide, the molecular weight adjustment process and/or during the grinding process according to step d). The polyvalent cations may also be produced in-situ, e.g., by addition of an acid or acidic reacting salt. The polyvalent cations may be added instead of monovalent cations or in combination with monovalent cations.

According to one embodiment, the carboxylic groups of the at least one modified polysaccharide are at least partly neutralized by adding to the aqueous mineral pigment material suspension prior or during the grinding step d) one or more polyvalent cations.

Preferably, the multivalent cations are selected from $Sr^{2+}$, $Ca^{2+}$, or $Mg^{2+}$, and most preferably from $Ca^{2+}$ added in form of $Ca(OH)_2$ in suspension and/or solution.

The polyvalent cations can be added in an amount corresponding to 0.1 to 5 wt.-%, preferably 2 to 3 wt.-%, based on the total weight of the dry partially or fully neutralized salt of CMC. $Ca(OH)_2$ may be added in amount from 50 to 500 ppm, based on the total weight of the dry pigment solids in the aqueous mineral material suspension, preferably in an amount from 200 to 300 ppm.

The polyvalent cations may be added in the form of an aqueous solution, suspension or powder, and preferably in the form of a suspension.

According to another embodiment of the present invention, the carboxylic groups of the at least one modified polysaccharide are at least partly neutralized by adding to the aqueous mineral pigment material suspension prior or during the grinding step d) one or more polyvalent cations, in situ formed, by adding an acid or acidic reacting salt. Preferably, the acid is $H_3PO_4$ or an acidic reacting salt thereof such as $Na_2HPO_4$, preferably $CaHPO_4$.

The $H_3PO_4$ or acidic reacting salt thereof may be added in amount from 50 to 500 ppm, based on the total weight of the dry pigment solids in the aqueous mineral material suspension, preferably in an amount from 200 to 400 ppm, in the form of an aqueous solution or suspension.

According to one exemplary embodiment of the present invention, the carboxylic groups of the at least one modified polysaccharide are at least partly neutralized by adding to the aqueous mineral pigment material suspension prior or during the grinding step d) a combination of one or more polyvalent cations and one or more monovalent cations, wherein the polyvalent cations preferably are selected from $Sr^{2+}$, $Ca^{2+}$, or $Mg^{2+}$, and most preferably from $Ca^{2+}$ added in form of $Ca(OH)_2$ in suspension and/or solution, and wherein the monovalent cations preferably are selected from $Li^+$, $Na^+$ or $K^+$.

Step d)

In step d) of the process according to the present invention, the aqueous mineral material suspension of step c) is ground.

According to one embodiment, the aqueous environment of the suspension to be ground has a pH from 7 to 12, preferably from 8 to 11, and more preferably from 8.5 to 10.5.

According to a preferred embodiment of the present invention, the solids content of the suspension to be ground during step d) is adjusted so that it is from 45 to 80 wt.-%, preferably from 45 to 60 wt.-%, more preferably from 48 to 58 wt.-%, and most preferably from 50 to 55 wt.-%, based on the total weight of the suspension.

The grinding process may be undertaken by all the techniques and grinders well known to the man skilled in the art for wet grinding. The grinding step may be carried out with any conventional grinding device, for example, under conditions such that refinement predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step d) may be carried out in batch or continuously, preferably continuously.

According to one embodiment of the present invention, the grinding step d) is carried out at a temperature from 25 to 110° C., preferably from 37 to 70° C.

According to one embodiment of the present invention, the inventive process does not involve the use or addition of a dispersing agent during the grinding.

According to another embodiment of the present invention, a dispersing agent is added before, during, or after process steps c) and/or d).

According to still another, optional embodiment of the present invention, a cross-linker for carboxyl and hydroxyl groups such as ammonium zirconium carbonate is added before, during, or after process steps c) and/or d).

According to one embodiment, the process of the invention may lead directly to a high solids suspension of self-binding pigment particles. Indeed, the process of the invention makes it possible to avoid a mandatory concentration step.

According to a second aspect, the present invention refers to a self-binding pigment particle suspension which is obtainable by the process according to the present invention. Such suspension contains a high solids content of self-binding mineral pigment particles, and preferably is free of stabilizing and/or dispersing agents.

According to a third embodiment, the process of the invention is more efficient in grinding, i.e., less energy is required to obtain the same particle size.

The self-binding pigment particles obtained by the inventive process may have a $d_{50}$ value from 0.05 to 15 µm, from 0.1 to 10 µm, from 0.5 to 5, or from 0.4 to 2 µm. The $d_{50}$ value is determined using a Sedigraph 5120 for the $d_{50}$ value between 2 to 0.4 µm and Malvern Laser Mastersizer for the $d_{50}$ value between 2 and 15 µm and $d_{50}$ value between 0.05 and 0.4 µm.

According to one embodiment of the present invention, the grinding step d) is carried out until the fraction of self-binding pigment particles having a particle size of less than 1 µm is greater than 5 wt.-%, preferably greater than 20 wt.-%, more preferably greater than 60 wt.-%, more preferably greater than 75 wt.-%, and most preferably greater than 85 wt.-%, based on the total weight of the pigment particles, as measured with a Sedigraph 5120.

The improved mechanical properties reflected by a very good adhesion of the binder to the surface of the mineral particles allow for the use of the inventive self-binding pigment particles in several applications, e.g., paper applications. Also the good cohesion properties (binding effect between particles) provides beneficial properties in such applications.

According to one embodiment of the present invention the self-binding pigment particle suspension obtainable by the inventive process is used in paper, plastics, paint, concrete and/or agriculture applications. According to an exemplary embodiment of the present invention, the self-binding particle suspension obtainable by the inventive process is used in paper, e.g., in wet end process of a paper machine, preferably in cigarette paper and/or coating applications, or preferably as support for rotogravure and/or offset and/or digital printing. More preferably the self-binding particle suspension obtainable by the inventive process is used in paper in wet end process for the production of SC-paper and/or copy paper. Another application is the coating of tree leaves and/or plant leaves to reduce sun light and UV exposure of the leave surface.

It is to be understood that the advantageous embodiments described above with respect to the inventive method for making self-binding pigment particles also can be used for preparing or defining the inventive suspension and its use. In other words, the preferred embodiments described above and any combinations of these embodiments can also be applied to the inventive suspension and its use.

The scope and interest of the invention will be better understood based on the following examples which are intended to illustrate certain embodiments of the invention and are non-limitative.

EXAMPLES

Methods and Materials

In the following, materials and measurement methods implemented in the examples are described.

Brookfield Viscosity

The Brookfield viscosity of the self-binding pigment particles suspension was measured after one hour of production and after one minute of stirring at room temperature at 100 rpm by the use of a Brookfield viscometer type RVT equipped with an appropriate spindle.

Particle Size

The particle distribution of the self-binding pigment particles was measured using a Sedigraph 5120 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Intrinsic Viscosity

The intrinsic viscosity was determined by a Schott AVS 370 system. The samples were dissolved in a 0.2 M NaCl solution, and subsequently, the pH was adjusted to 10 with NaOH. Measurements were performed at 25° C. with a capillary type 0a and corrected using the Hagenbach correction.

Degree of Carboxylation

The degree of carboxylation was determined by conductometric titration according to Katz et al. "The determination of strong and weak acidic groups in sulfite pulps" (Svensk Paperstidn., 1984, 6, pp. 48-53).

Whiteness (R457) and Yellowness Index Measurement

Whiteness and yellowness index was determined according to norm TAPPI T452/ISO 247. Glossiness was determined according to DIN 54 502/TAPPI 75.

PPS Roughness ISO 8791-4

The geometric form of a paper surface is defined as deviation from the ideal dead level. The more the surface approaches the ideal level, the smoother the paper is. The measuring method (PPS) is based on the measurement of the air leakage between the paper surface and an even measuring head. In case of the PPS roughness, the depth of the pores is measured by a defined circle. The higher the measured value is, the "rougher" the paper surface is.

1. Testing of the Self-binding Properties of the Pigment Particles Obtained by the Present Invention Tablet Crushing Test This test is a measure for the self-binding power of a pigment. It is a measure for the force needed to crush tablets that were formed from the self-binding pigment slurries.

To demonstrate the suitability for the self-binding character of the pigmentary particles thus obtained, tablets were formulated using a membrane filtration process. In this regard, an apparatus of the high-pressure filter press type was used, manufactured from a hollow steel tube. The said tube is closed at the top by a lid and contains the filtration membrane at the bottom.

A volume of 80 ml of the suspension obtained in Examples 1 to 5 was introduced into the tube of the high-pressure filter press. A constant pressure of 15 bar was then applied, which enables the water to be eliminated via the membrane filter, until a tablet of 20 mm thickness is obtained.

The obtained tablets were then dried at a temperature of 60° C. for 2 days.

The device and method used are described in detail in the document entitled "Modified calcium carbonate coatings with rapid absorption and extensive liquid uptake capacity" (Colloids and Surfaces A, 236 (1-3), 2003, pp. 91-102).

The quasi-cylindrical solid tablets of pigmentary particles were then ground using a disk mill (Jean Wirtz, Phoenix 4000) in the form of disk-shaped samples having a diameter of 2.0-2.1 cm and a thickness of 0.6-0.7 cm. This procedure is described in the document entitled "Fluid transport into porous coating structures: some novel findings" (Tappi Journal, 83 (5), 2000, pp. 77-78).

The samples thus obtained underwent a crush resistance test on a Zwick-Roell tension machine with a WN158988 control unit, using a rod/flat system (with a hemispherical end). The force of the cell was 20 kN.

The samples were crushed at a speed of 3 mm/min$^1$ over a length of 10 mm. The maximum force needed to crush the tablet was recorded. The results for Examples 1 to 5 are listed in Table 1

Example 1

Comparative Example

The pigment particles of this example are commercially available as Hydrocarb 90-ME from Omya. The product is in the form of a slurry of a natural $CaCO_3$ and has a solid content of 78.0 wt.-%.

The particle size distribution of the mineral pigment material, measured on a Sedigraph 5120, was as follows: 90 wt.-% was smaller than 2 µm, 65 wt.-% was smaller than 1 µm, and 15 wt.-% was smaller than 0.2 µm.

The tablet crushing test gave a maximum Force $F_{max}$ of 256 N.

Example 2

Inventive Example

A natural $CaCO_3$ from Norway having a fineness corresponding to a $d_{50}$ value of 42 to 48 µm was employed as mineral pigment material, and a carboxymethylcellulose (commercially available from Sigma Aldrich, No. 419273) was used as the polymeric binder.

The intrinsic viscosity of the carboxymethylcellulose (CMC) was 327 ml/g, and the degree of substitution was 0.7.

The natural $CaCO_3$ was used in the form of a filter cake having a solids content of 70.0 wt.-%. From this filter cake a slurry with a solid content of 50.0 wt-% was prepared by adding 2.0 wt.-% of a 4.7% solution of the above carboxymethylcellulose.

The wet grinding of the slurry was done in tap water (15° dH) in a vertical attritor mill (Dynomill®, Bachofen, Switzerland) having a volume of 0.6 litres in a recirculation mode, using zirconium silicate beads of 0.6 to 1.0 mm diameter, until a $d_{50}$ value of 0.6 µm was achieved.

The particle size distribution of the mineral pigment material, measured on a Sedigraph 5120, was as follows: 95 wt.-% was smaller than 2 µm, 75 wt.-% was smaller than 1 µm, and 13 wt.-% was smaller than 0.2 µm.

The tablet crushing test gave a maximum Force $F_{max}$ of 1 300 N.

Example 3

Inventive Example

A natural $CaCO_3$ from Norway having a fineness corresponding to a $d_{50}$ value of 42 to 48 µm was employed as mineral pigment material, and a carboxymethylcellulose (commercially available from Sigma Aldrich, No. 419281) was used as the polymeric binder.

The intrinsic viscosity of the carboxymethylcellulose (CMC) was 460 ml/g, and the degree of substitution was 1.2.

The natural $CaCO_3$ was used in the form of a filter cake having a solids content of 70.0 wt.-%. From this filter cake a slurry with a solid content of 45.0 wt-% was prepared by adding 2.0 wt.-% of a 2.5% solution of the above carboxymethylcellulose.

The wet grinding of the slurry was done in tap water (15° dH) in a vertical attritor mill (Dynomill®, Bachofen, Switzerland) having a volume of 0.6 litres in a recirculation mode, using zirconium silicate beads of 0.6 to 1.0 mm diameter, until a $d_{50}$ value of 0.6 µm was achieved.

The particle size distribution of the mineral pigment material, measured on a Sedigraph 5120, was as follows: 95 wt.-% was smaller than 2 µm, 75 wt.-% was smaller than 1 µm, and 13 wt.-% was smaller than 0.2 µm.

The tablet crushing test gave a maximum Force $F_{max}$ of 970 N.

Example 4

Inventive Example

A natural $CaCO_3$ from Norway having a fineness corresponding to a $d_{50}$ value of 42 to 48 µm was employed as mineral pigment material, and a carboxymethylcellulose (commercially available from Sigma Aldrich, No. 419311) was used as the polymeric binder.

The intrinsic viscosity of the carboxymethylcellulose (CMC) was 460 ml/g, and the degree of substitution was 0.7.

The natural $CaCO_3$ was used in the form of a filter cake having a solids content of 70.0 wt.-%. From this filter cake a slurry with a solid content of 45.0 wt-% was prepared by adding 2.0 wt.-% of a 2.5% solution of the above carboxymethylcellulose.

The wet grinding of the slurry was done in tap water (15° dH) in a vertical attritor mill (Dynomill®, Bachofen, Switzerland) having a volume of 0.6 litres in a recirculation mode, using zirconium silicate beads of 0.6 to 1.0 mm diameter, until a $d_{50}$ value of 0.6 µm was achieved.

The particle size distribution of the mineral pigment material, measured on a Sedigraph 5120, was as follows: 95 wt.-% was smaller than 2 µm, 75 wt.-% was smaller than 1 µm, and 13 wt.-% was smaller than 0.2 µm.

The tablet crushing test gave a maximum Force $F_{max}$ of 2 663 N.

TABLE 1

Tablet crushing test results

| Example | Comment | | $F_{max}$ [N] |
|---|---|---|---|
| 1 | Comparative | Co-grinding with Polyacrylate | 256 |
| 2 | Inventive | Co-grinding with CMC (327 ml/g; 0.7) | 1 300 |
| 3 | Inventive | Co-grinding with CMC (460 ml/g; 1.2) | 970 |
| 4 | Inventive | Co-grinding with CMC (460 ml/g; 0.7) | 2 663 |

From the results listed in Table 1 it is clearly evident that the pigment particles obtained by the present invention show a much better self-binding power compared to pigment particles that have been prepared by the same process, however, with the use of another polymeric binder, namely a polyacrylate binder.

2. Testing of Mechanical Strength Properties of Paper Containing the Self-binding Pigment According to the Present Invention Handsheet Preparation and Evaluation The handsheet study and the consequent testing of the mechanical strength properties of the paper is a measure for the ability of the self-binding pigment to bind to other surfaces like cellulosic fibers.

Thermo mechanical pulp (TMP) 85% and Pine Kraft pulp (15%) refined to 27° SR (Schopper-Riegler) were used for the handsheet study. The blend of the thermo mechanical pulp and the pine kraft pulp had 80° SR. 60 g (dry) pulp blend were diluted in 10 $dm^3$ tap water, and then the filler was added. The filler was a blend of 25% Intramax 50 (Clay, commercially available from Imerys International Ltd, UK) and 75% of the products described in examples 5, 6 or 7. The suspension was stirred for 30 minutes. Subsequently 0.06% (based on dry weight) of a polyacrylamide (Polymin 1530, commercially available from BASF, Ludwigshafen, Germany) was added as a retention aid and sheets of 52 $g/m^2$ were formed using the Rapid-Köthen hand sheet former. Each sheet was dried using the Rapid-Köthen drier. The filler content in the handsheets was determined by burning a quarter of a dry handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet. The filler content in the examples 6-8 was 41-42%.

The sheets were calendered with a Voith calender to 0.95-1.05 PPS roughness.

The mechanical strength properties of the handsheets were characterized by the tensile index and internal bond according to ISO 1924-2 and SCAN-P80:98/TAPPI T541, respectively, after drying of the handsheets. The results for the mechanical strength properties of the tested papers are listed in Table 2.

Example 5

Comparative Example

The pigment particles used in this example are commercially available as Hydrocarb HO-ME from Omya. The product is in the form of a slurry of a natural $CaCO_3$ and has a solid content of 65.0 wt.-%.

The particle size distribution of the mineral pigment material, measured on a Sedigraph 5120, was as follows: 85 wt.-% was smaller than 2 µm, 60 wt.-% was smaller than 1 µm, and 20 wt.-% was smaller than 0.2 µm.

The measured tensile index of the handsheet prepared with the pigment particles obtained in this example was 17 Nm/g, and the measured internal bond was 560 kPa.

Example 6

Comparative Example

A natural $CaCO_3$ from Norway having a fineness corresponding to a $d_{50}$ value of 42 to 48 µm was employed as mineral pigment material, and a carboxymethylcellulose (CMC) as polymeric binder. The intrinsic viscosity of the carboxymethylcellulose (CMC) was 179 ml/g, and the degree of substitution was 1.2.

Preparation of Carboxymethylcellulose (CMC) Binder 214 g commercially available CMC (from ACROS Organics) having an $M_w$ of 250 000 g/mol, a carboxylation degree of 1.2, and an intrinsic viscosity of 774 ml/g, was dissolved in 2 460 ml water and stirred for 12 h at room temperature. Subsequently, the solution was heated to 80° C., and 800 µl of a 30 wt.-% $H_2O_2$ solution were added dropwise. After 5 h, 60 µl of said $H_2O_2$ solution were added dropwise. Thereafter, 2 times another 60 µl of said $H_2O_2$ solution were added dropwise in 1.5 h intervals. Finally, the solution was stirred for another 1.5 h at 80° C. The obtained CMC binder had an intrinsic viscosity of 179 ml/g and a pH of 7.

A slurry with a solid content of 60 wt.-% was prepared by adding 2 wt.-% of the prepared CMC binder in form of a 9.9 wt.-% solution in water to the mineral pigment material suspension.

The wet grinding of the slurry was done in tap water (15° dH) in a vertical attritor mill (Dynomill®, Bachofen, Switzerland) having a volume of 0.6 litres in a recirculation mode, using zirconium silicate beads of 0.6 to 1.0 mm diameter, until a $d_{50}$ value of 0.8 µm was achieved.

The particle size distribution of the mineral pigment material, measured on a Sedigraph 5120, was as follows: 90 wt.-% was smaller than 2 µm, 65 wt.-% was smaller than 1 µm, and 20 wt.-% was smaller than 0.2 µm.

The measured tensile index of the handsheet prepared with the pigment particles obtained in this example was 23 Nm/g, and the measured internal bond was 610 kPa.

Example 7

Inventive Example

A natural $CaCO_3$ from Norway having a fineness corresponding to a $d_{50}$ value of 42 to 48 µm was employed as mineral pigment material, and a carboxymethylcellulose (CMC) (commercially available from Sigma Aldrich, No. 419273) was used as the polymeric binder.

The intrinsic viscosity of the CMC was 327 ml/g, and the degree of substitution was 0.7.

The natural $CaCO_3$ was used in the form of a filter cake having a solids content of 70.0 wt.-%. From this filter cake a slurry with a solid content of 50.0 wt-% was prepared by adding 2.0 wt.-% of a 4.7% solution of the above carboxymethylcellulose.

The wet grinding of the slurry was done in tap water (15° dH) in a vertical attritor mill (Dynomill®, Bachofen, Switzerland) having a volume of 0.6 litres in a recirculation mode, using zircon silicate beads of 0.6 to 1.0 mm diameter, until a $d_{50}$ value of 0.6 µm was achieved.

The particle size distribution of the mineral pigment material, measured on a Sedigraph 5120, was as follows: 95 wt.-% was smaller than 2 µm, 75 wt.-% was smaller than 1 µm, and 13 wt.-% was smaller than 0.2 µm.

The measured tensile index of the handsheet prepared with the pigment particles obtained in this example was 25 Nm/g, and the measured internal bond was 630 kPa.

TABLE 2

Mechanical strength properties for the tested papers

| Example | | Comment: Polymeric binder (intrinsic viscosity; degree of carboxylation) | Tensile index [Nm/g] | Internal bond [kPa] |
|---|---|---|---|---|
| 6 | Comparative | Co-grinding with Polyacrylate | 17 | 560 |
| 7 | Comparative | Co-grinding with CMC (179 ml/g; 1.2) | 23 | 610 |
| 8 | Inventive | Co-grinding with CMC (327 ml/g; 0.7) | 25 | 630 |

It is clearly apparent from Table 2 that the self-binding pigments prepared by the inventive process show an improved ability to bind to other surfaces like cellulosic fibers. This is demonstrated by the tensile index of inventive example 8 (25 Nm/g) which is higher than the tensile indices of comparative examples 6 (17 Nm/g) and 7 (23 Nm/g). In addition, the internal bond of the inventive example 8 (630 kPa) is also higher than the internal bond of comparative examples 6 (560 kPa) and 7 (610 kPa).

3. Grinding Efficiency

The following examples are intended to demonstrate the grinding efficiency of the inventive process of the present invention.

Example 8

Comparative Example

A natural $CaCO_3$ from Norway having a fineness corresponding to a $d_{50}$ value of 42 to 48 µm was employed as mineral pigment material, and a carboxymethylcellulose (CMC) (commercially available from CP Kelco, Atlanta, USA under the tradename Finnfix 5) as polymeric binder. The intrinsic viscosity of the carboxymethylcellulose (CMC) was 118 ml/g, and the degree of substitution was 0.7.

The natural $CaCO_3$ was used in the form of a filter cake having a solids content of 70.0 wt.-%. From this filter cake a slurry with a solid content of 50.0 wt-% was prepared by adding 2.0 wt.-% of a 4.7% solution of the above carboxymethylcellulose.

The wet grinding of the slurry was done in tap water (15° dH) in a vertical attritor mill (Dynomill®, Bachofen, Switzerland) having a volume of 0.6 litres in a recirculation mode, using zirconium silicate beads of 0.6 to 1.0 mm diameter. The recirculation was carried out six times.

The particle size distribution of the particles obtained after passing the mill six times, measured on a Sedigraph 5120, was as follows: 97 wt.-% were smaller than 2 µm, 68 wt.-% were smaller than 1 µm, and the $d_{50}$ was 0.8 µm.

Example 9

Inventive Example

A natural $CaCO_3$ from Norway having a fineness corresponding to a $d_{50}$ value of 42 to 48 µm was employed as mineral pigment material, and a carboxymethylcellulose (commercially available from Sigma Aldrich, No. 419273) was used as the polymeric binder.

The intrinsic viscosity of the carboxymethylcellulose (CMC) was 327 ml/g, and the degree of substitution was 0.7.

The natural CaCO$_3$ was used in the form of a filter cake having a solids content of 70.0 wt.-%. From this filter cake a slurry with a solid content of 50.0 wt-% was prepared by adding 2.0 wt.-% of a 4.7% solution of the above carboxymethylcellulose.

The wet grinding of the slurry was done in tap water (15° dH) in a vertical attritor mill (Dynomill®, Bachofen, Switzerland) having a volume of 0.6 litres in a recirculation mode, using zirconium silicate beads of 0.6 to 1.0 mm diameter. The recirculation was carried out six times.

The particle size distribution of the particles obtained after passing the mill six times, measured on a Sedigraph 5120, was as follows: 98 wt.-% were smaller than 2 µm, 87 wt.-% were smaller than 1 µm, and the d$_{50}$ was 0.5 µm.

Example 10

Inventive Example

A natural CaCO$_3$ from Norway having a fineness corresponding to a d$_{50}$ value of 42 to 48 µm was employed as mineral pigment material, and a carboxymethylcellulose (commercially available from Sigma Aldrich, No. 419311) was used as the polymeric binder.

The intrinsic viscosity of the carboxymethylcellulose (CMC) was 460 ml/g, and the degree of substitution was 0.7.

The natural CaCO$_3$ was used in the form of a filter cake having a solids content of 70.0 wt.-%. From this filter cake a slurry with a solid content of 45.0 wt-% was prepared by adding 2.0 wt.-% of a 2.5% solution of the above carboxymethylcellulose.

The wet grinding of the slurry was done in tap water (15° dH) in a vertical attritor mill (Dynomill®, Bachofen, Switzerland) having a volume of 0.6 litres in a recirculation mode, using zirconium silicate beads of 0.6 to 1.0 mm diameter. The recirculation was carried out six times.

The particle size distribution of the particles obtained after passing the mill six times, measured on a Sedigraph 5120, was as follows: 99 wt.-% were smaller than 2 µm, 85 wt.-% were smaller than 1 µm, and the d$_{50}$ was 0.5 µm.

From the results obtained by this testing it is evident that the inventive process provides a much higher fraction of particles finer than 1 µm (namely 87 wt.-% and 85 wt.-%, respectively) compared to the comparative example (68 wt.-%). This is also confirmed by a d$_{50}$ of 0.5 µm for the inventive examples, compared to the d$_{50}$ of 0.8 µm for the comparative example.

The invention claimed is:

1. A process for preparing self-binding pigment particles comprising the following steps:
    a) providing an aqueous mineral pigment material suspension, wherein the mineral pigment comprises calcium carbonate;
    b) providing at least one modified polysaccharide binder having a degree of carboxylation in the range of 0.4 to 2.0 and having an intrinsic viscosity in the range of >300 to 500 ml/g;
    c) mixing the binder of step b) with the aqueous mineral pigment material suspension of step a) so that the binder is present in the suspension in an amount from 0.1 to 10.0 wt.-% and the resulting suspension has a solids content of 45 to 95 wt.-%, based on the total weight of the suspension; and
    d) grinding the resulting suspension of step c) to obtain a suspension of self-binding pigment particles, wherein the grinding is carried out until the fraction of self-binding pigment particles having a particle size of less than 1 µm is greater than 60 wt.-%, based on the total weight of the pigment particles.

2. The process according to claim 1, wherein the at least one modified polysaccharide is carboxymethylcellulose.

3. The process according to claim 1, wherein in step c) the binder is present in the suspension in an amount from 0.2 to 5 wt.-%, based on the total weight of the suspension.

4. The process according to claim 1, wherein in step c) the binder is present in the suspension in an amount from 0.25 to 3.0 wt.-%, based on the total weight of the suspension.

5. The process according to claim 1, wherein the binder is in form of a solution or a dry material.

6. The process according to claim 1, wherein the binder is in form of an aqueous solution having a binder concentration from 0.5 to 50 wt.-%, based on the total weight of the solution.

7. The process according to claim 1, wherein the binder is in form of an aqueous solution having a binder concentration from 1 to 40 wt.-%, based on the total weight of the solution.

8. The process according to claim 1, wherein the binder is in form of an aqueous solution having a binder concentration from 3 to 20 wt.-%, based on the total weight of the solution.

9. The process according to claim 1, wherein the binder is in form of an aqueous solution having a binder concentration from 4 to 10 wt.-%, based on the total weight of the solution.

10. The process according to claim 1, wherein the binder is composed of a mixture of two or more types of modified polysaccharide.

11. The process according to claim 1, wherein the solids content of the resulting suspension in step c) is from 45 to 80 wt.-%, based on the total weight of the suspension.

12. The process according to claim 1, wherein the solids content of the resulting in step c) is from 45 to 60 wt.-%, based on the total weight of the suspension.

13. The process according to claim 1, wherein the solids content of the resulting suspension in step c) is from 48 to 58 wt.-%, based on the total weight of the suspension.

14. The process according to claim 1, wherein the solids content of the resulting suspension in step c) is from 50 to 55 wt.-%, based on the total weight of the suspension.

15. The process according to claim 1, wherein the carboxylic groups of the at least one modified polysaccharide are at least partly neutralized by adding to the aqueous mineral pigment material suspension prior or during the grinding step d) one or more polyvalent cations, wherein the polyvalent cations are selected from the group consisting of Sr$^{2+}$, Ca$^{2+}$ and Mg$^{2+}$.

16. The process according to claim 1, wherein the carboxylic groups of the at least one modified polysaccharide are at least partly neutralized by adding to the aqueous mineral pigment material suspension prior or during the grinding step d) one or more polyvalent cations, wherein the polyvalent cations are Ca$^{2+}$, added in form of Ca(OH)$_2$ in suspension and/or solution.

17. The process according to claim 1, wherein the carboxylic groups of the at least one modified polysaccharide are at least partly neutralized by adding to the aqueous mineral pigment material suspension prior or during the grinding step d) one or more polyvalent cations, in situ formed, by adding a compound selected from the group consisting of H$_3$PO$_4$, Na$_2$HPO$_4$, and CaHPO$_4$.

18. The process according to claim 1, wherein the carboxylic groups of the at least one modified polysaccharide are at least partly neutralized by adding to the aqueous mineral pigment material suspension prior or during the grinding step d) one or more monovalent cations, wherein the monovalent cations are selected from the group consisting of $Li^+$, $Na^+$ and $K^+$.

19. The process according to claim 1, wherein the carboxylic groups of the at least one modified polysaccharide are at least partly neutralized by adding to the aqueous mineral pigment material suspension prior or during the grinding step d) a combination of one or more polyvalent cations and one or more monovalent cations, wherein the polyvalent cations are selected from the group consisting of $Sr^{2+}$, $Ca^{2+}$ and $Mg^{2+}$, and wherein the monovalent cations are selected from the group consisting of $Li^+$, $Na^+$ and $K^+$.

20. The process according to claim 1, wherein the carboxylic groups of the at least one modified polysaccharide are at least partly neutralized by adding to the aqueous mineral pigment material suspension prior or during the grinding step d) a combination of one or more polyvalent cations and one or more monovalent cations, wherein the polyvalent cations are $Ca^{2+}$ added in form of $Ca(OH)_2$ in suspension and/or solution, and wherein the monovalent cations are selected from the group consisting of $Li^+$, $Na^+$ and $K^+$.

21. The process according to claim 1, wherein the grinding step d) is carried out until the fraction of self-binding pigment particles having a particle size of less than 1 μm is greater than 75 wt.-%, based on the total weight of the pigment particles.

22. The process according to claim 1, wherein the grinding step d) is carried out until the fraction of self-binding pigment particles having a particle size of less than 1 μm is greater than 85 wt.-%, based on the total weight of the pigment particles.

23. The process according to claim 1, wherein before or during or after steps c) and/or d) a dispersing agent is added.

24. The process according to claim 1, wherein the mineral pigment material is calcium carbonate, or calcium carbonate and one or more of dolomite, magnesium, clay, talc, kaolin, aluminium hydroxide, mica, titanium dioxide, synthetic fibers and natural fibers.

25. The process according to claim 1, wherein the mineral pigment is selected from the group consisting of a ground natural calcium carbonate, a precipitated calcium carbonate, a modified calcium carbonate, and any mixture thereof.

26. The process according to claim 1, wherein the degree of carboxylation of the at least one modified polysaccharide is in the range of 0.5 to 1.8.

27. The process according to claim 1, wherein the degree of carboxylation of the at least one modified polysaccharide is in the range of 0.6 to 1.0.

28. The process according to claim 1, wherein the degree of carboxylation of the at least one modified polysaccharide is in the range of 0.7 to 0.9.

29. The process according to claim 1, wherein the intrinsic viscosity of the at least one modified polysaccharide is in the range of 320 to 450 ml/g.

30. The process according to claim 1, wherein the intrinsic viscosity of the at least one modified polysaccharide is in the range of 330 to 550 ml/g.

31. The process according to claim 1, wherein the at least one modified polysaccharide has a degree of carboxylation of 0.4 to 1.

32. The process according to claim 1, wherein the at least one modified polysaccharide has a degree of carboxylation of 0.4 to 1, and an intrinsic viscosity in the range of 320 to 450 ml/g.

33. The process according to claim 1, wherein the at least one modified polysaccharide has a degree of carboxylation of 0.4 to 1, and an intrinsic viscosity in the range of 330 to 350 ml/g.

34. The process according to claim 1, wherein the grinding step d) is carried out at a temperature from 25 to 110° C.

35. The process according to claim 1, wherein the grinding step d) is carried out at a temperature from 35 to 75° C.

36. The process according to claim 1, wherein the grinding step d) is carried out in batch or continuously.

37. A self-binding pigment particle suspension obtained by the process of claim 1.

38. Paper, plastic, paint, concrete or agriculture product comprising the self-binding pigment particle suspension of claim 37.

39. Paper comprising the self-binding pigment particle suspension of claim 37.

40. An agriculture product comprising the self-binding pigment particle suspension of claim 37.

* * * * *

UNITED STATES PATENT AND TRADEMARK OFFICE
CERTIFICATE OF CORRECTION

PATENT NO. : 10,723,886 B2
APPLICATION NO. : 14/238233
DATED : July 28, 2020
INVENTOR(S) : Gantenbein et al.

It is certified that error appears in the above-identified patent and that said Letters Patent is hereby corrected as shown below:

On the Title Page

In the Applicant (71): Insert -- Omya International AG, Oftringen (CH) --

Signed and Sealed this
Fifteenth Day of September, 2020

Andrei Iancu
*Director of the United States Patent and Trademark Office*